May 3, 1938.  J. W. McMILLEN  2,116,443
BRACKET ATTACHMENT FOR AUTOMOBILES
Filed Oct. 19, 1937   2 Sheets-Sheet 2
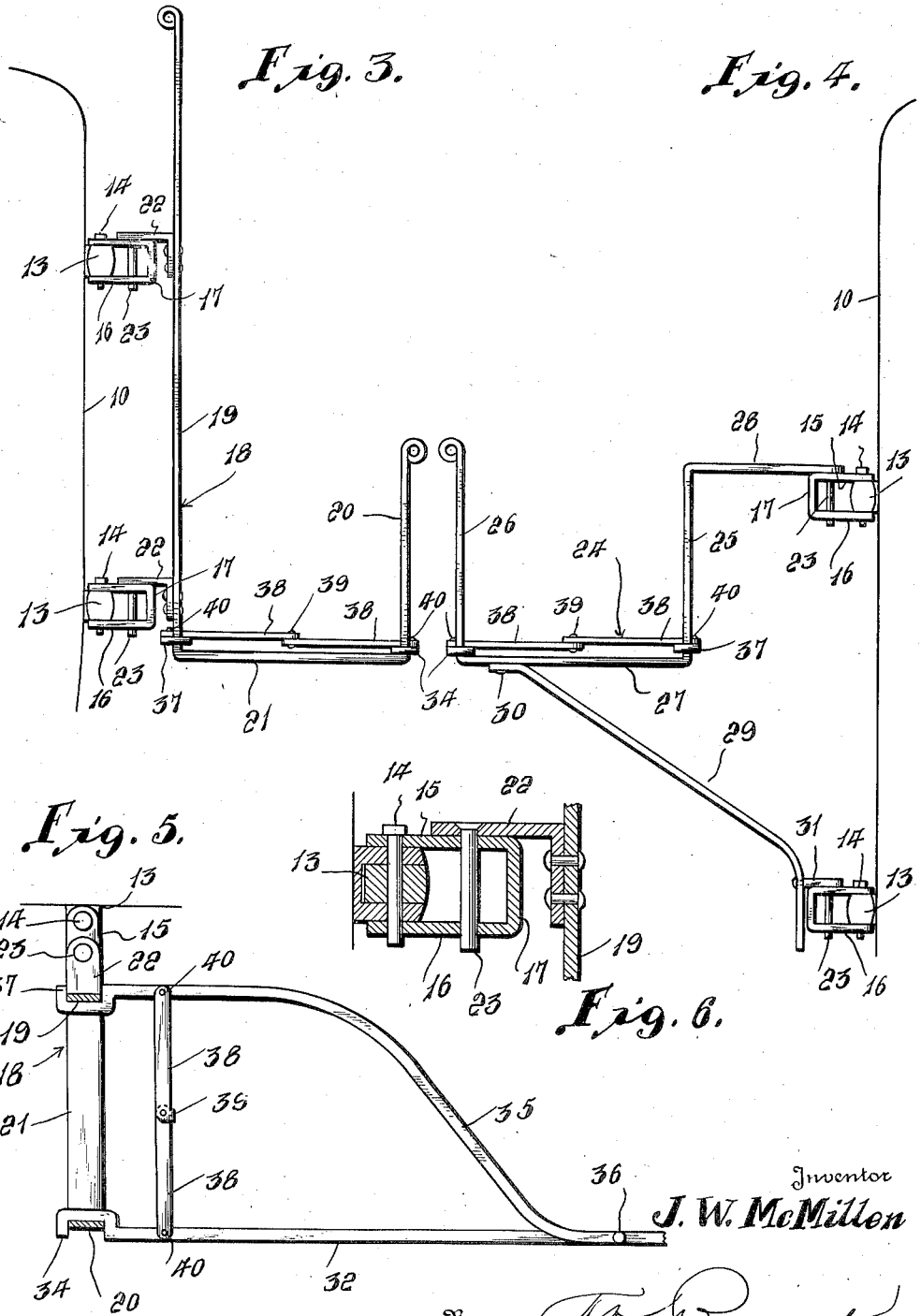
Inventor
J. W. McMillen
By T. K. Bryant.
Attorney.

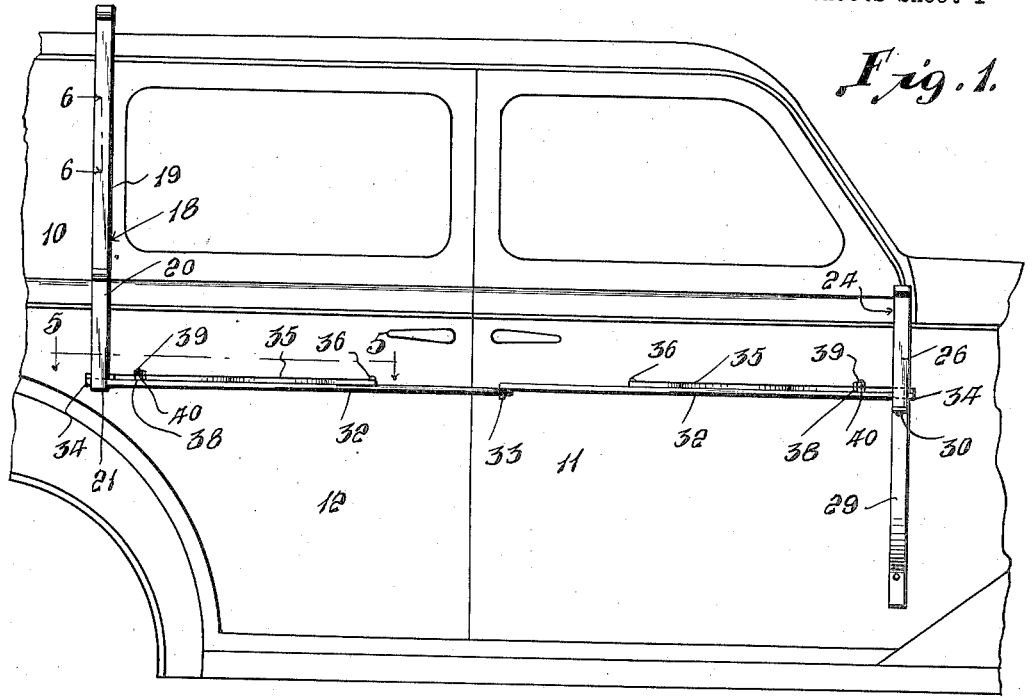

Patented May 3, 1938

2,116,443

UNITED STATES PATENT OFFICE 2,116,443

BRACKET ATTACHMENT FOR AUTOMOBILES

James W. McMillen, Nashville, Tenn.

Application October 19, 1937, Serial No. 169,865

2 Claims. (Cl. 224—29)

This invention relates to certain new and useful improvements in bracket attachments for automobiles.

The primary object of the invention is to provide a bracket attachment for automobiles for the support and carriage of lumber, ladders or similar devices to be used by workmen in the pursuit of different trades.

A further object of the invention is to provide a bracket attachment for automobiles wherein the brackets are associated with the hinge connections between the doors and body of the automobile, the mounting of the brackets being of a permanent character, if desired, and designed for the removable attachment of racks for the support of materials and the like to be transported.

With the above and other objects in view that will become apparent as the nature of the invention is better understood, the same consists in the novel form, combination and arrangement of parts hereinafter more fully described, shown in the accompanying drawings and claimed.

In the drawings:—

Figure 1 is a fragmentary side elevational view of an automobile equipped with the bracket attachment and the racks carried by the brackets;

Figure 2 is a fragmentary top plan view of an automobile equipped with the brackets and rack;

Figure 3 is a fragmentary rear elevational view showing the brackets and rack supported on the hinge connections for the rear door of the automobile;

Figure 4 is an elevational view showing the brackets and rack associated with the hinge connections for the front door of the automobile;

Figure 5 is a horizontal detail sectional view taken on line 5—5 of Figure 1; and Figure 6 is a detail vertical sectional view taken on line 6—6 of Figure 1.

As shown in Figure 1 of the drawings, the automobile body 10 has front and rear doors 11 and 12 respectively, the doors 11 and 12 are respectively mounted at their front and rear edges to the body of the automobile as shown in Figures 3 and 4 by means of a pair of vertically aligned hinge connections 13, each of which includes a removable pintle 14 common to door mountings of such character for holding the hinge connections in assembled relation.

The bracket and rack attachment for the automobile is associated with the hinge connection for the doors, preferably at the right hand side of the car body, a bracket being associated with each of the two hinge connections for a door as shown in Figures 3 and 4, each bracket being of U-shape and having upper and lower legs 15 and 16 connected at corresponding ends by a crosspiece 17. The free ends of the legs 15 and 16 have openings therein that register with openings in the hinge connection 13, the hinge pintle 14 being removed from the hinge connection 13 to permit placement of the U-shaped bracket with the hinge pintle 14 thereafter returned to its assembly with the hinge connection 13 and passed through the openings in the upper and lower legs 15 and 16 of the bracket for retaining the bracket in position on the hinge connection as shown in Figures 3 and 4.

If desired, the U-shaped bracket may be possessed of sufficient ornamentation so that the same may remain permanently attached to the hinge connection 13 without marring or disturbing the general appearance of the automobile and still permit free opening movements of the doors 11 and 12. The attachment of the bracket to the hinge connection 13 is also clearly shown in the detail sectional view, Figure 6.

A rack is adapted to be detachably engaged with the bracket for the support of ladders, boards or other devices of considerable length that are adapted to be transported by the automobile and as the hinges for the front and rear doors of the automobile are of different elevations, the rack has been designed for attachment to the bracket and to present the floor or article support of the rack in a horizontal plane. The end 18 of the rack associated with the hinge connections for the rear door 12 includes a strap of U-shape having a relatively long inner leg 19 and a relatively short outer leg 20 connected by a bottom cross leg 21. A pair of vertically aligned horizontal arms 22 project at right angles from the inner vertical leg 19 and each of said arms 22 carries a depending pin 23 for removable reception in vertically aligned openings in the upper and lower legs 15 and 16 of the U-shaped bracket for the support of the rear end of the rack on the hinge connections for the rear door 12.

The front end 24 of the rack includes a U-shaped support including inner and outer legs 25 and 26 respectively connected by a bottom cross leg 27. A horizontal arm 28 is carried by and extends outwardly of the upper end of the inner leg 25, the pins 23 depending from the free end of the arm 28 passing through openings in the upper and lower legs 15 and 16 of the U-shaped bracket. A diagonally extending bar 29 is connected at its upper end as at 30 to the bottom cross leg 27 and the horizontally extending arm 31 carried by the lower end of the bar 29 carries a depending pin 23 for passage through openings in the upper and lower legs 15 and 16 of the U-shaped bracket.

A foldable rack frame is supported at its ends on the rear and front portions 18 and 24 of the rack, said frame comprising a pair of rods 32 having an end pivotal connection 33, the outer end of each rod 32 carrying an offset clamp 34 to be engaged with the other vertical legs 20 and 26 of the end portions 18 and 24 of the rack. An arcuate bar 35 is pivoted to each rod 32 as at 36 and carries an offset clamp 37 at its free end for engagement with the inner legs 19 and 25 of the end portions 18 and 24 of the rack. The clamps 34 and 37 are retained in their extended positions by means of a pair of links 38 hingedly connected together at adjacent ends as at 39 with the outer ends thereof pivotally connected as at 40 to the rods 32 and arcuate rods 35 adjacent their outer ends. When the links 38 are collapsed by movement of their hinge connection 39, the clamps 34 and 37 are disengaged from the end portions 18 and 24 of the rack so that the rack frame may be folded into a compact position.

From the above detailed description of the invention, it is believed that the construction and use thereof will at once be apparent and while there is herein shown and described the preferred embodiment of the invention, it is nevertheless to be understood that minor changes may be made therein without departing from the spirit and scope of the invention as claimed.

I claim:—

1. In a luggage carrier of the character described, the combination with the hinges of automobile doors, of a bracket supported on each hinge, a rack detachably mounted on the bracket at one side of the automobile, the rack including a pair of end supports, pins carried by each end support for detachable connection with a pair of vertically aligned brackets on one set of door hinges, and a foldable and collapsible rack frame including a pair of spreadable end clamps at each end thereof for engagement with the adjacent end support and hinged links between the clamps of each pair for holding the end clamps spread apart and in engagement with the end supports.

2. In a luggage carrier of the character described, the combination with the hinges and hinge pintles of automobile doors, of U-shaped brackets, each having its legs straddling a hinge and retained thereon by the hinge pintle, a rack detachably mounted on the brackets at one side of the automobile, the rack including a pair of end supports, pins carried by each end support for detachable connection with a pair of vertically aligned brackets on one set of door hinges, and a foldable and collapsible rack frame including a pair of spreadable end clamps at each end thereof for engagement with the adjacent end support and hinged links between the clamps of each pair for holding the end clamps spread apart and in engagement with the end supports.

JAMES W. McMILLEN.